E. ENOS.
RESILIENT METAL TIRE.
APPLICATION FILED JAN. 5, 1920.
1,381,069.
Patented June 7, 1921.
2 SHEETS—SHEET 1.
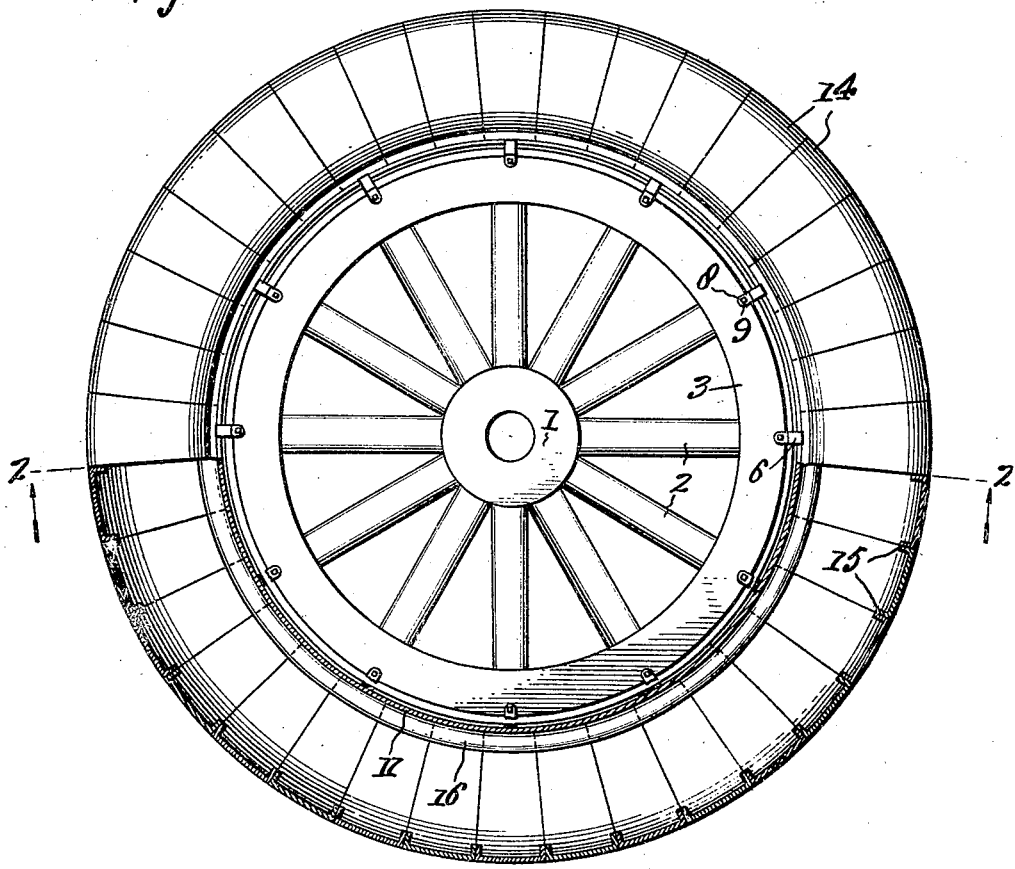
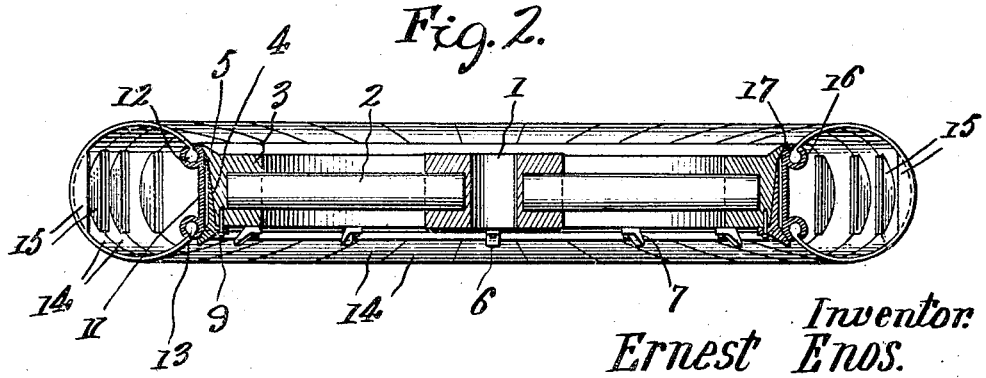
Inventor.
Ernest Enos.
by Wilkinson & Giusta
Attorneys.

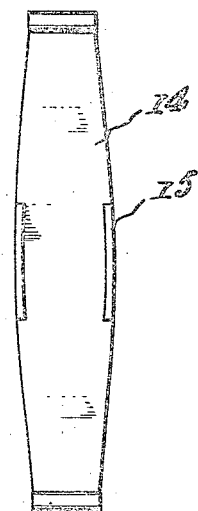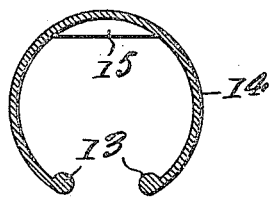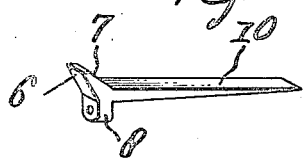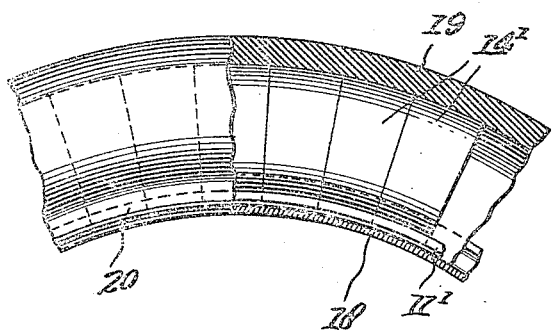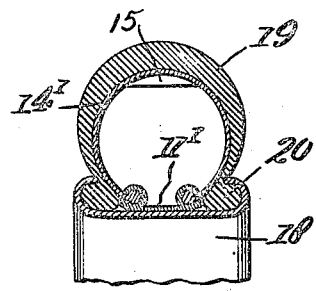

UNITED STATES PATENT OFFICE.

ERNEST ENOS, OF TAMPA, FLORIDA.

RESILIENT METAL TIRE.

1,381,069.　　　　　Specification of Letters Patent.　　Patented June 7, 1921.

Application filed January 5, 1920. Serial No. 349,517.

*To all whom it may concern:*

Be it known that I, ERNEST ENOS, a British subject of the Dominion of Canada, residing at Tampa, in the county of Hillsborough and State of Florida, have invented certain new and useful Improvements in Resilient Metal Tires; and I do hereby declare the following to be a full, clear, and exact description of the invention, such as will enable others skilled in the art to which it appertains to make and use the same.

The present invention relates to improvements in metal resilient tires, and has for an object to provide a tire of this character to take the place of the usual pneumatic tire as at present extensively employed on automobiles and the like.

Another object of the invention is to provide a tire of this character which will possess all the resiliency of the pneumatic tire and at the same time avoid the trouble and inconvenience incident to the use of the pneumatic tire, which involves replacement of tires in case of puncturing.

It is a further object of the present invention to provide an improved resilient metal tire of an economical and simple construction applicable to wheels of standard type with little modification.

In the accompanying drawings forming a part of this application, and in which similar reference symbols indicate corresponding parts in the several views:

Figure 1 is a side elevational view of a wheel constructed according to the present invention and shown partially in section.

Fig. 2 is a horizontal sectional view taken on the line 2—2 in Fig. 1.

Fig. 3 is a plan view of one of the spring segments laid out.

Fig. 4 is a cross sectional view of one of the segments in the curved position assumed when in actual use.

Fig. 5 is a cross section through the central portion of one of the sections.

Fig. 6 shows one of the lugs for securing the demountable rim to the wheel.

Fig. 7 is a cross sectional view of a slightly modified form of the invention; and Fig. 8 is a fragmentary elevational view, partly in section, of the same.

Referring more particularly to the drawings, 1 designates the hub, 2 the spokes, and 3 the felly of a wheel body, which may be made in accordance with any approved construction, except that the outer edge 4 of the felly is beveled or inclined transversely and at the higher side thereof is provided with an integral ring 5.

Lugs 6, shown in detail in Fig. 6, are spaced about the lower edge of the felly and are beveled as indicated at 7 on their faces next the tire for coöperating with a similarly formed inner face of the ring 5. The lugs 6 have perforated ears 8 extending inwardly from the same to receive bolts 9 which pass into the body of the felly 3.

The lugs 6 also have associated, and preferably formed integral therewith, elongated tongues 10 which pass transversely across the inclined face 4 of the felly and are preferably tapered outwardly from the lugs so as, while lying with their inner faces in close contact with the inclined face 4 of the felly, to present a straight transverse surface on their outer edges to the demountable rim 11. This rim 11 is made of a diameter to freely slip over the face 4 of the felly, and the same is wedged outwardly on the inclined faces of the ring 5 and lugs 6, when the lugs are put in place and secured by the fastenings 9. The condition of assembly is indicated in Fig. 2.

The rim 11 is formed at its edges with annular channels 12 adapted to receive beads 13 formed on the inner ends of metallic curved segments 14. The segments are made of a suitable width and are formed substantially in the manner shown more particularly in Figs. 3, 4 and 5, the segments being cut or stamped from resilient metal to a shape resembling a barrel stave with the ends thereof provided with the beads 13 and the central wider or bulged portion stamped out or otherwise provided with integral flanges 15 at right angles to the segments 14 and inwardly thereof.

As shown in Fig. 5, the segments 14 are curved in a direction circumferentially of the tire to form a uniform and unbroken tread portion adapted to come evenly into contact with the ground to avoid any jarring of the vehicle. The segments are made of a required resiliency to support vehicles of different loads, and the flanges 15 reinforce the tread portion of the segments, preventing any cracking or rupturing thereof and at the same time not interfering with the proper resiliency thereof.

The channels 12 of the demountable rim 11 are made up of claws 16 and 17 bent circularly and have a gap separating their free ends to admit the inner portions of the segments 14 adjacent the beads 13. These claws 16 or 17, or one of them, may be bent about the beads 13, or the demountable rim 11 may be of the split type and the beads 13 may be slipped circumferentially into the channels 12 at the split portion of the rim and slid around to their proper places, after which the rim may be closed and mounted on the wheel.

Referring more particularly to Figs. 7 and 8, 18 represents a metallic demountable rim of a conventional type, and 19 designates a shoe similar to the pneumatic shoes at present used and provided with beads 20 which engage in the usual manner beneath the curved flanges of the rim 18. Instead of inserting the usual pneumatic inner tube within the shoe 19, segments 14' similar to the segments above described, may be fitted within the casing for holding the same out in a distended, yet resilient, condition, and such segments 14' may be mounted in connection with a demountable rim 11' similar in all respects to the demountable rim above described with the exception that the same has narrower transverse proportions so as to fit between the beads 20 of the casing or shoe 19. In this case the outer casing or shoe 19 posseses all the resiliency afforded by the pneumatic tube and at the same time is non-puncturable and of increased wearing qualities.

It is obvious that those skilled in the art may vary the details of construction and arrangements of parts without departing from the spirit of my invention, and therefore I do not wish to be limited to such features except as may be required by the claim.

I claim:

A spring wheel comprising a felly, a rim detachably mounted on said felly and provided with a channel at each side thereof, and a series of abutting spring plates each bent substantially in the form of a horseshoe in transverse section, and each plate provided with enlarged ends adapted to engage in said channels, and with inwardly projecting ribs formed on each side of and integral with the central portion of the plate, the outer faces of said ribs bearing against the corresponding faces of the ribs on the adjacent plates, whereby the tread portion of the plates is reinforced and stiffened, and the spring effect of said plates is secured by the sides thereof, substantially as described.

ERNEST ENOS.